S. CONNER.
Clothes-Line Tightener.
No. 202,634. Patented April 23, 1878.
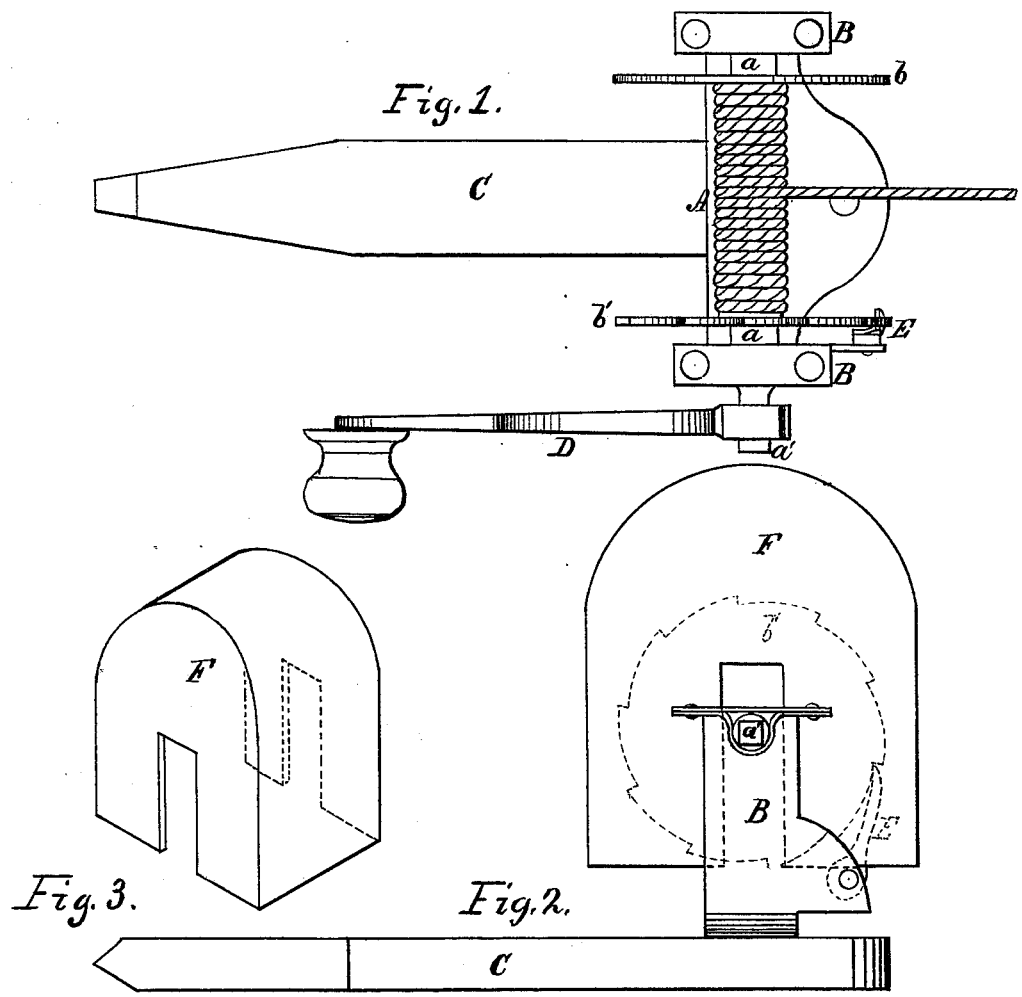
WITNESSES.
Geo. T. Brereton
Edwin James
INVENTOR.
Samuel Conner
Per Wm. H. Brereton
Atty.

UNITED STATES PATENT OFFICE.

SAMUEL CONNER, OF WASHINGTON, IOWA, ASSIGNOR OF ONE-HALF HIS RIGHT TO JOSEPH G. STEWART, OF SAME PLACE.

IMPROVEMENT IN CLOTHES-LINE TIGHTENERS.

Specification forming part of Letters Patent No. 202,634, dated April 23, 1878; application filed October 3, 1877.

*To all whom it may concern:*

Be it known that I, SAMUEL CONNER, of Washington, in the county of Washington and State of Iowa, have invented certain new and useful Improvements in Clothes-Line Reel, Tightener, and Protector; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to household or kitchen utensils; and it consists of an improved clothes-line reel, tightener, and protector, as hereinafter more fully described.

The object of this invention is to provide a simple, cheap, and convenient device for tightening either wire or other clothes-lines, and upon which the line may be wound when not in use, and protected from dust, dirt, and inclement weather, said device being adapted to be easily and quickly applied, without trouble, either to a fence, wall, side of a building, or other object, as may be desired or found necessary.

In the drawings, Figure 1 is a plan view of the device in use as a tightener; Fig. 2, a side elevation, showing the protector in position; Fig. 3, a detached perspective view of the removable case or protector.

A is the reel, journaled in a frame or bracket, B, which is secured to the large end of a sharp-pointed spike, C. The reel A is composed of a shaft or drum, $a$, made to extend outward beyond the frame B to form the crank-shaft $a'$, upon which the crank D is received, and the side disks $b\ b'$, the disk $b'$ being formed into a ratchet-wheel, which engages with a click or pawl, E, secured to the frame B. F is the removable cover or protector, made with a curved top and with slotted sides, to adapt it to fit down over the reel and its shaft, as shown in Fig. 2.

The different parts of this device—consisting of the reel A, bracket B, pawl E, and cover F—may be made of any convenient material, such as malleable iron, tin, or other sheet metal, which may then be painted to protect the parts from rust, or the whole may be made of galvanized iron, which I prefer, because of its being non-corrosive. The spike C may be made either of wood or metal, as desired.

The operation of the device is as follows: For use as a tightener, the spike containing the reel, &c., is first driven into the wall or other object at the desired position, and one end of the rope or wire secured to the shaft $a$. The crank D is then slipped on the shaft $a'$, and the reel revolved, which winds the rope thereon. This is continued until the proper degree of tension is attained, when the pawl E slips in place and prevents the backward turning and consequent unwinding of the rope. All stretching and slack of the rope may thus be quickly and effectually taken up by simply giving the reel a slight turn, so as to bring the pawl into a new position.

When the clothes-line is not in use the outside end of the rope is removed from its fastening and the entire length of rope wound upon the reel A. The cover F is then slipped in position over the reel, thus preventing the reel and rope from injury from dust, dirt, and the weather.

By means of this simple device clothes-lines may always be kept tight and in a dry, clean, and good condition, thus effecting a great saving in the cost of clothes-lines.

Having thus described my invention, what I claim as new, and desire to secure by Letters Patent, is—

The clothes-line reel, tightener, and protector, consisting of reel A, journaled in bracket B, sharp-pointed spike C, for securing the device in position, and removable cover F, with slotted sides which fit down over the square portion of the shaft of the reel, all as and for the purposes specified.

In testimony that I claim the foregoing as my own I hereby affix my signature in presence of two witnesses.

SAMUEL CONNER.

Witnesses:
C. J. JONES,
J. F. HENDERSON.